A. B. DOWELL.
WIRE STRETCHER.
APPLICATION FILED MAY 4, 1912.
1,054,283.
Patented Feb. 25, 1913.
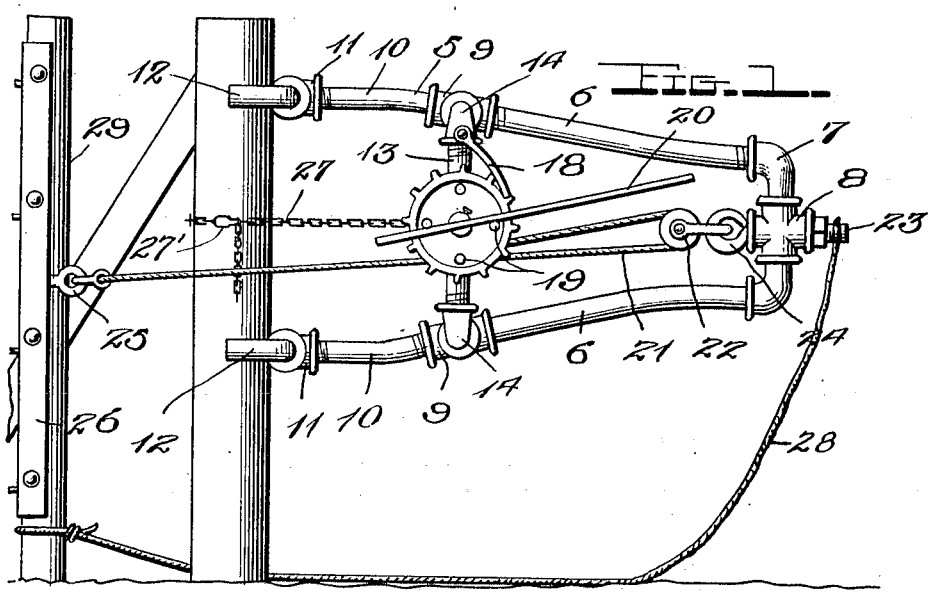
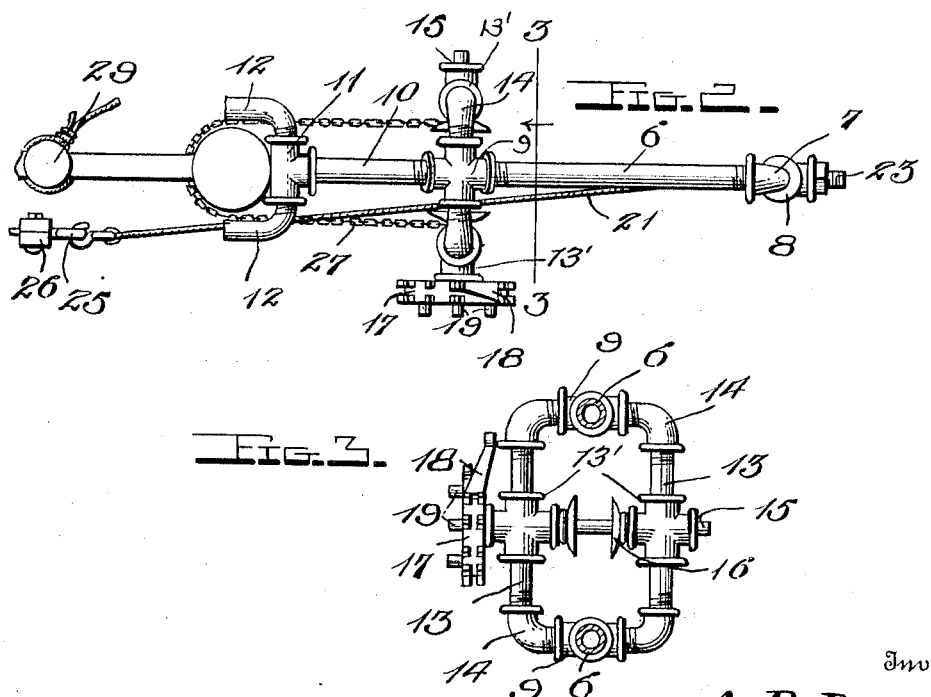
Witnesses
Chas. L. Griesbauer.
A. B. Norton.
Inventor
A. B. Dowell,
By Watson E. Coleman
Attorney

UNITED STATES PATENT OFFICE.

ALBERT B. DOWELL, OF GARRETTSVILLE, OHIO.

WIRE-STRETCHER.

1,054,283.　　　　Specification of Letters Patent.　　Patented Feb. 25, 1913.

Application filed May 4, 1912. Serial No. 695,207.

*To all whom it may concern:*

Be it known that I, ALBERT B. DOWELL, a citizen of the United States, residing at Garrettsville, in the county of Portage and State of Ohio, have invented certain new and useful Improvements in Wire-Stretchers, of which the following is a specification, reference being had to the accompanying drawings.

This invention relates to improvements in wire stretchers and has for its primary object to provide a simple, durable and efficient device of this character which may be easily and quickly arranged upon an anchoring post to stretch the wire and hold the same in a taut condition while it is being stapled to the post.

A further and more specific object of the invention resides in the provision of a frame structure constructed of piping and including curved bearing members for engagement with the post, a drum mounted in the frame having one end of a cable connected thereto adapted to be attached at its other end to a clamp secured upon the wire fabric, means for operating the drum, and chains connected to the drum shaft and to the brace bar of the anchoring post to force the frame toward the post as the chain is wound upon the drum.

With the above and other objects in view the invention consists in the novel features of construction and in the combination and arrangement of parts hereinafter more fully described, pointed out in the claim and shown in the accompanying drawings, in which, Figure 1 is a side elevation of the wire stretcher embodying the present invention showing the same mounted upon an anchoring post; Fig. 2 is a top plan view; and Fig. 3 is a section taken on the line 3—3 of Fig. 2.

Referring in detail to the drawing 5 designates a frame structure which comprises the longitudinally disposed pipe sections 6 threaded at one of their ends in the elbow members 7 which are in turn connected to a coupling member or union 8. The pipe sections 6 extend in divergent relation from the members 7 and are connected at their other ends to the cross-shaped coupling members 9. To these latter members the pipe sections 10 are connected. Upon the ends of the pipe sections 10 the curved post engaging arms 12 are mounted by means of the T-shaped coupling members 11.

The vertical parallel pipes 13 are connected at their upper and lower ends to the elbows 14 which are threaded in the cross-shaped couplings 9. In the cross shaped bearings 13′ arranged on the pipes 13 the ends of a drum shaft 15 are rotatably mounted, said shaft being provided between the pipes 13 with the spaced heads 16. Upon one end of this drum shaft which projects beyond the frame, a ratchet 17 is keyed or otherwise rigidly secured and upon the frame a gravity pawl 18 is pivotally mounted for engagement with the teeth of said ratchet. A plurality of pins 19 project from the face of the ratchet and with these pins a suitable operating lever indicated at 20 is adapted to be engaged whereby the ratchet may be turned to rotate the drum and wind a cable 21 thereon. The cable 21 passes around a pulley or sheave 22 which is attached to an eye bolt 23 secured in the coupling member 8. As before stated one end of said cable is secured to the frame, and the other end thereof is provided with a hook 24 to engage with an eye or loop 25 on the wire clamp 26.

The stretcher is retained in position upon the post by means of the chains 27 which are connected at one of their ends to the drum shaft 15. One of these chains is adapted to be passed around the post and is provided upon its end with a link or loop 27′ through which the end of the chain is adapted to be drawn. In this manner the stretcher is properly retained in position upon the post and the operator relieved of the necessity of supporting the same. A rope 28 has one of its ends secured to a brace post 29 which is connected to the anchoring post by an inclined bar to brace the same against pressure thereon by the stretcher when the wire fabric is drawn taut. After the stretcher has been mounted upon the post as shown in Fig. 1, the same is swung laterally in the opposite direction upon the anchoring post to that side of the post whereon the cable 21 extends, and the rope 28 then tightened by taking up the slack therein and securing the same to the outer end of the stretcher frame. This rope effectually prevents the stretcher frame from being swung laterally upon the post as the wire fabric is tightened.

From the foregoing description the operation of my improved stretcher will be understood as follows: The curved arms 12 of the stretcher frame are engaged upon the side of the anchoring post remote from the fence wire fabric and the hook on the end of the chain or cable 21 is engaged with the loop of the wire clamp as shown in Fig. 1. The operator now engages the lever 20 with the pins 19 on opposite sides of the drum shaft and turns the ratchet wheel 17 in the proper direction to rotate the drum and wind the cable thereon. The wire fabric is thus drawn past the post to which it is to be stapled, the rope 28 drawing the stretcher frame toward the anchor post upon which the same is mounted and holding the curved arms 12 tightly against the same thereby preventing lateral swinging movement of the frame on the post which would otherwise be occasioned by the pull or strain of the wire fabric as the same is drawn toward it. After the wire has been tightened as desired, the same is securely stapled to the anchoring post in the usual manner after which the stretcher is removed.

From the foregoing the construction and manner of operation of my improved wire stretcher will be clearly understood.

The device may be easily and quickly mounted in its operative position and removed after the stretching operation is completed. As the frame is entirely constructed of sections of piping, it will be obvious that the same can be manufactured at very small cost. As but few parts are employed in the construction of the device it will also be seen that the same is extremely strong, durable and efficient in practical use.

While I have shown and described the preferred construction and arrangement of the various elements, it will be understood that the invention is susceptible of considerable modification without departing from the essential features or sacrificing any of the advantages thereof.

What I claim is:—

A wire stretcher comprising longitudinally disposed pipe sections, a vertically disposed coupling rigidly connecting the outer ends of said pipe sections, cross shaped couplings threaded upon the inner ends of said pipe sections, additional horizontally disposed pipe sections carried by said cross shaped couplings, post engaging arms carried upon the outer ends of said last mentioned pipe sections, parallel vertical pipe sections connected to said last mentioned couplings, said vertical pipe sections being formed with flanged bearing openings, a drum rotatably mounted in said flanged bearing openings, a sheave attached to said first mentioned coupling, a cable attached at one end to said drum and at the other end to a fence clamp, said cable passing over the sheave, means for operating the drum, and a pair of anchoring chains connected at one of their ends to the drum shaft and adapted to be connected at their other ends to a fence post.

In testimony whereof I hereunto affix my signature in the presence of two witnesses.

ALBERT B. DOWELL.

Witnesses:
J. S. TILDEN,
J. W. GRIFFIN.

Copies of this patent may be obtained for five cents each, by addressing the "Commissioner of Patents, Washington, D. C."